United States Patent [19]

Prentiss et al.

[11] Patent Number: 5,317,452
[45] Date of Patent: May 31, 1994

[54] ALIGNING AND ATTACHING A LENS TO A SOURCE OF EMITTED LIGHT USING LIGHT PRESSURE FORCE

[75] Inventors: Mara Prentiss; Juliet A. Mervis, both of Cambridge, Mass.; Adam H. Bloom, Westbury, N.Y.; Farhad Zarinetchi, Brookline, Mass.

[73] Assignee: Harvard University, Cambridge, Mass.

[21] Appl. No.: 977,816

[22] Filed: Nov. 17, 1992

[51] Int. Cl.$^5$ ............................ G02B 7/02; G02B 6/32
[52] U.S. Cl. ...................................... 359/819; 359/297; 385/34; 385/89; 385/93; 250/227.11; 65/2
[58] Field of Search .................. 359/819, 297; 385/89, 385/34, 93, 92, 12, 14; 372/20, 42; 250/227.14, 461.1, 227.11; 65/2, 3.11

[56] References Cited

U.S. PATENT DOCUMENTS

| | | | |
|---|---|---|---|
| 4,079,404 | 3/1978 | Comerford et al. | 385/14 |
| 4,762,395 | 8/1988 | Gordon et al. | 359/819 |
| 4,793,688 | 12/1988 | Aiki et al. | 359/819 |
| 4,818,053 | 4/1989 | Gordon et al. | 385/93 |
| 4,867,521 | 9/1989 | Mallinson | 385/34 |
| 4,932,989 | 6/1990 | Presby | 65/2 |
| 5,096,671 | 3/1992 | Kane et al. | 385/12 |

OTHER PUBLICATIONS

Dakss et al., Simple Self-Centering Technique For Mounting Microsphere Coupling Lens On A Fibre, 1980, Electronic Letters, vol. 16, pp. 463-464.

Ashkin, Applications of Laser Radiation Pressure, 1980, Science, vol. 210, pp. 1081-1088.

Ashkin et al., Observation of a single-beam gradient force optical trap for dielectric particles, 1986, Optics Letters, vol. 11, pp. 288-290.

Askin et al., Internal Cell Manipulation Using Infrared Laser Traps, 1989, Proc. Natl. Acad. Sci. USA, vol. 86, pp. 7914-7918.

Berns et al., Use of a Laser-Induced Optical Force Trap to Study Chromosome Movement on the Mitotic Spindle, 1989, Proc. Natl. Acad. Sci. USA, vol. 86, pp. 4539-4543.

Ashkin et al., Optical Trapping and Manipulation of Viruses and Bacteria, 1987 Science, vol. 235, pp. 1517-1520.

Ashkin et al., Radiation Pressure on a Free Liquid Surface, 1973, Physical Review Letters, vol. 30, pp. 139-142.

*Primary Examiner*—Loha Ben
*Attorney, Agent, or Firm*—Choate, Hall & Stewart

[57] ABSTRACT

A method for the use of light pressure to optically center a lens on a source of emitted light with submicron accuracy. In one aspect the method uses light pressure to optically center a lens on a source of emitted light, where the lens is then fixed in place. In another aspect the method uses light pressure to create an optically centered lens from a dielectric liquid on a source of emitted light, the shaped lens is then fixed to form an optically aligned permanent lens. By choosing the appropriate lens the light emitted from the source can be either focused or collimated.

23 Claims, 4 Drawing Sheets

ALIGNING AND ATTACHING A LENS TO A SOURCE OF EMITTED LIGHT USING LIGHT PRESSURE FORCE

BACKGROUND OF THE INVENTION

Accurately attaching a lens to a light source such as to the core of an optical fiber is of critical importance in many applications of fiber optics, including optical communications and medicine. For example, the ease and efficiency of the coupling of light into and out of an optical fiber can be greatly improved if an appropriate lens is attached to the fiber. In communication systems, an external lens added to a fiber can be used to focus output light onto a smaller and faster detector, thus increasing the ultimate speed of the system. A lens-affixing technique would also be advantageous in other areas, such as biological or medical applications, where the accurate delivery of a small, intense beam spot is required. In all of these applications, performance is enhanced as the alignment of the optical center of the lens with an intensity maximum of the fiber is improved.

Several methods are currently available to align a lens with a laser or an optical fiber including mechanical methods, laser ablation, and the use of surface tension forces. U.S. Pat. Nos. 4,818,053 and 4,079,404 describe support structures, or an "optical bench", for aligning optical components such as lasers, lenses, and optical fibers. U.S. Pat. No. 4,867,521 describes a mechanical method for mounting a lens on a glass plate and then mounting an optical fiber in relation to the lens and glass plate such that the emerging light is collimated. The alignment of the fiber with the glass plate and the lens is determined by monitoring the emitted light with a photodetector, while adjusting the position of the plate relative to the lens until the maximum output is produced. The elements are then fixed in place with a UV-curable adhesive. U.S. Pat. No. 4,932,989 describes the fabrication of microlenses on optical fibers through the use of a pulsed laser beam to ablate the end portion of a fiber.

A method has also been described for centering a lens on an optical fiber using the surface tension of an adhesive that has been applied to the fiber (Dakss et al., 1980, *Electronics Lett.*, Vol 16, pp. 463–464). In this method the adhesive is applied to the fiber tip, and a micromanipulator and a low power microscope are used to aid in the centering of the fiber over a spherical lens. The fiber is lowered so that the adhesive contacts the lens. The surface tension of the adhesive then moves the lens to the center of the fiber core, and the adhesive is cured. This method permits centering of a lens on the fiber core with an accuracy of only approximately 3 microns.

It is desired to achieve an inexpensive, simple and reliable method that improves the accuracy of the centering of lenses upon optical fibers and other light sources having an intensity maximum.

SUMMARY OF THE INVENTION

The invention is a method for the use of light pressure to optically center a lens on a source of emitted light with submicron accuracy. In one embodiment, the method uses light pressure to optically center a lens on a source of emitted light, and the centered lens can then be fixed in place. In another embodiment, the method uses light pressure to create an optically centered lens on a source of emitted light, and the lens can then be fixed in place.

In one aspect, the invention features a method for aligning the optical center of a lens with a source of emitted light having an intensity maximum by positioning a lens in proximity to a source of emitted light, allowing light pressure to center the lens, and affixing the centered lens to the source.

A "source of emitted light", as used herein, is any source that emits light or transmits light having an intensity gradient that is maximum at its center. This source can be, for example, a single or dual core optical fiber, a laser diode, and a wave guide. "Light pressure", as used herein, is defined as the force associated with the momentum transfer caused by light scattering due to differences in the index of refraction. "Allowing light pressure to center the lens", as used herein, is so stated to define the varying lengths of time that are required for a lens to be centered on a source. The length of time for each lens to be centered is a function of the size of the lens, the viscosity of any medium that surrounds the lens, the peak intensity, the intensity gradient, the index difference between the lens and the medium, the absorption of the lens and the medium, and the thermal dissipation. "A centered or aligned lens", as used herein, is a lens in which the optical center of the lens is aligned with the intensity maximum of the light emitted from the source.

In preferred embodiments the source of emitted light can be a single core optical fiber, a dual core optical fiber, a laser diode, or a wave guide. In preferred embodiments the lens can be formed of polystyrene, glass, or other suitable lens material. In some preferred embodiments the lens can be affixed to the source with an adhesive that is curable by exposure to UV radiation, or by exposure to high intensity laser light. Most preferably, the lens can be affixed to the source by using a chemical treatment such as simultaneous exposure to silicon tetrachloride and water vapor which results in a thin glass coating encasing both the fiber tip and the lens.

In preferred embodiments a lens is attached to a single core optical fiber that is emitting light having an intensity maximum by the steps of placing a fiber tip in contact with a solution containing lenses, aligning the axis of the fiber vertically, allowing light pressure from the light emitted by the fiber to align the lens, allowing the solution to evaporate, and chemically fixing the lens to the fiber tip using silicon tetrachloride. In preferred embodiments a lens can be attached to a dual core fiber, a laser diode or a wave guide using the same steps as for a single core optical fiber.

In preferred embodiments a lens is attached to a single core optical fiber that is emitting light having an intensity maximum by the steps of coating a tip of the fiber with an adhesive element, placing the coated tip in contact with lenses in a solution, aligning the axis of the fiber vertically, allowing light pressure from the fiber output to align the lens, allowing the solution to evaporate, and curing the adhesive. In preferred embodiments a lens can be attached to a dual core optical fiber, a laser diode or a wave guide using the same steps as for a single core optical fiber.

In general, in another aspect, the invention features a method for creating an optically aligned lens on a source of emitted light having an intensity maximum by applying a dielectric liquid to the source of emitted light, allowing light pressure from the source to deform the dielectric liquid, and fixing the liquid to form an aligned lens.

In preferred embodiments the dielectric liquid is polystyrene, paraffin, acetate, or some other dielectric liquid having the desired index of refraction. In preferred embodiments the source of emitted light is a single or dual core optical fiber, a laser diode, or a wave guide. In preferred embodiments the intensity of the light used to form the lens is between 10 mW and 200 mW, and higher. In preferred embodiments any general process for fixing the liquid into a stable surface is desirable. Preferably the dielectric liquid is fixed using high intensity light.

In preferred embodiments, an optically aligned lens is created on a single core optical fiber that is emitting light having an intensity maximum by the steps of coating the tip of a fiber with a dielectric liquid, aligning the axis of the fiber vertically, allowing light pressure from the fiber to deform the dielectric liquid, and fixing the dielectric liquid to form a permanent lens. In preferred embodiments, an optically aligned lens is created on a dual core optical fiber, a laser diode or a wave guide using the same steps as for a single core optical fiber.

The method of the invention for aligning a lens on a source of emitted light using light pressure centers the lens more accurately than the methods using mechanical means or surface tension. The method of the invention is simpler, cheaper and more flexible than the sculpting method. Additionally, the method according to the invention is transportable and can be properly implemented by personnel that have minimal training or knowledge in the art. Furthermore, unlike the sculpting method, the diameter and index of refraction of the attached lens in the method according to the invention can be tailored to a variety of specifications. Unlike the surface tension method, the light pressure method for centering a lens allows the centering of a lens on the positioning on top of the core of an optical fiber even when the core is not located at the center of the fiber.

DESCRIPTION OF THE PREFERRED EMBODIMENTS

BRIEF DESCRIPTION OF THE DRAWINGS

FIG. 2a shows the intensity for a naked fiber, FIG. 2b shows the intensity for a fiber having a lens made from liquid polystyrene, and FIG. 2c shows the intensity for a fiber having a 6 micron spherical polystyrene lens.

FIG. 4a shows a molded polystyrene lens that was formed through the use of high intensity light to liquify 6 micron spherical polystyrene lenses and light pressure to mold the lens. FIG. 4b shows a molded polystyrene lens made from liquified polystyrene using light pressure to mold the lens. FIG. 4c is an enhanced view of lens portion of the molded lens seen in FIG. 4b.

LENS ALIGNMENT AND ATTACHMENT

It is known that focused coherent light attracts an object, which has an index of refraction higher than that of the surrounding medium, that is within the beam to the intensity maximum at the center of the beam at a point that is beyond the focal point of the lens (Ashkin, 1980, *Science*, Vol. 210, pp. 1081–1088; Ashkin et al., 1986, *Optics Letters*, Vol. 11, pp. 288–290). This property of laser light has been used to manipulate small cells, such as bacteria, and cell organelles (see for example, Ashkin et al., 1987, *Science*, Vol. 235, pp. 1517–1520; Ashkin et al., 1989, *Proc. Natl. Acad. Sci.*, USA, Vol. 86, pp. 7914–7918; Berns et al., 1989, *Proc. Natl. Acad. Sci.*, USA, Vol. 86, pp. 4539–4543). Ashkin et al. (*Phys. Rev. Lett.*, Vol. 30, pp. 139–142) has also described that focused pulsed laser light exerts a force on a dielectric liquid at the liquid surface that results in a deformation of the liquid.

A spherical lens can be aligned on the core of an optical fiber, for example, by the steps of dipping the fiber tip into a vessel containing spherical lenses in a solution, aligning the fiber axis vertically with the tip either up or down, and coupling light through the fiber. The axis of the fiber is aligned vertically to reduce the effects of gravity upon the medium containing the lens. The light pressure force centers the lens on the core of the fiber, and the solution is allowed to evaporate. The lens is preferably fixed in place by exposing the tip of the fiber and the centered lens to a chemical such as silicon tetrachloride. The optical alignment of the lens with the intensity maximum of the emitted light can be observed by the cylindrically symmetric intensity of the emitted light, and an increase or decrease in the numerical aperture ("NA") relative to a naked fiber.

Alternatively, a spherical lens can be fixed in place using an adhesive. In this embodiment a lens can be aligned on the core of an optical fiber, for example, by the steps of coating the fiber tip with a thin layer of an adhesive, dipping the fiber tip into a vessel containing spherical lenses in a solution, aligning the fiber axis vertically with the tip either up or down, and coupling light through the fiber. The light pressure force centers the lens on the core of the fiber, and the solution is allowed to evaporate. The lens is then fixed in place by curing the adhesive. The optical alignment of the lens with the intensity maximum of the emitted light can be observed by the cylindrically symmetric intensity of the emitted light, and an increase or decrease in the numerical aperture ("NA") relative to a naked fiber.

For example, to affix a lens to an optical fiber using the chemical silicon tetrachloride, an optical fiber can be dipped into water containing 6 micron diameter polystyrene balls (Interfacial Dynamics Corporation, IDS catalog number 2-234-54). The fiber axis is then aligned vertically to reduce the effects of gravity upon the medium containing the lens. Approximately 0.1 mW light can be coupled through the fiber to center the lens, and the water is allowed to evaporate. After the ball is centered the fiber tip and centered lens can be exposed to silicon tetrachloride by wafting the chemical over the fiber tip. Silicon tetrachloride will react with the residual water to form hydrochloric acid and a thin film of silicon dioxide on the surface of the lens and the fiber tip. The film of silicon dioxide adheres the lens to the fiber tip. The output intensity can be observed on a screen, if desired, by using a few mW of power.

Alternatively to affix a lens to an optical fiber using an adhesive, the tip of an optical fiber can be dipped into a mixture of UV curable optical cement (Norland Optical Adhesive 81 Cat. 8101) diluted with acetone and then dipped into water containing 6 micron diameter polystyrene balls (Interfacial Dynamics Corporation, IDS catalog number 2-234-54). The fiber axis is then aligned vertically to reduce the effects of gravity upon the medium containing the lens. Approximately 0.1 mW light can be coupled through the fiber to center the lens, and the water is allowed to evaporate. After the ball is centered the optical cement can be hardened by exposing the fiber tip to a UV lamp. For this optical cement approximately 20 minutes of UV exposure was sufficient to cure the cement and adhere the lens to the fiber. Once the lens is centered and fixed in place, the output intensity can be observed on a screen using a few mW of power.

Spherical glass lenses can be attached to a fiber tip using the method described above, and fixed to the fiber tip using either an adhesive or silicon tetrachloride. The glass lens can be centered on the fiber tip using about 0.1 mW of light. For a glass lens the described optical cement can be cured either with UV light or by increasing the intensity of the laser light through the fiber to approximately 100 mW.

The strength of the lens attachment to the fiber can be tested by placing the fiber tip in an ultra-sonic cleaner. A polystyrene lens that was fixed to a fiber tip using the UV curable adhesive described above would remain attached to the fiber in one out of four attempts at dislodging the lens in an ultra-sonic cleaner. A glass lens that has been attached to a fiber by curing the optical cement with intense light remains attached to the fiber in approximately three out of four attempts at dislodging the lens in an ultra-sonic cleaner. Most notably, a lens that was fixed to a fiber tip using silicon tetrachloride could not be removed from the fiber tip by placing the tip in an ultra-sonic cleaner for about one minute.

Attempts to attach a centered polystyrene lens to the tip of an optical fiber using high intensity laser light resulted in the liquification of the polystyrene. However, the liquified polystyrene can be molded into a lens by light pressure, and this approach to forming a lens was successful. For example, a fiber tip can be coated with 6 micron polystyrene balls and the light intensity can be set at 50 to 200 mW to liquify the polystyrene. At powers greater than 10 mW, an increase in the radius of the spot on the screen is accompanied by the formation of a series of concentric diffraction rings. This is consistent with the formation of a lens in front of the fiber core. At powers near 80 mW, the concentric diffraction rings fluctuate in time. Eventually, these rings stabilize, so that even at powers much higher than 80 mW the diffraction pattern does not change shape.

A lens can also be formed from liquified polystyrene. To accomplish this, polystyrene can be liquified, for example on a hot plate and the fiber tip can be dipped into the liquified polystyrene. The axis of the fiber is aligned vertically, and light is coupled through the fiber. At transmitted powers near 50 mW a lens can be formed in the liquid and its characteristic intensity pattern can be observed. When the power is lowered below 20 mW the lensing pattern disappears, and the lensing reappears when the power is increased again. The process can be repeated many times.

A polystyrene lens that is molded from either liquid polystyrene or by liquifying polystyrene balls, can be cured to form a permanent lens. A polystyrene lens that is shaped by using about 10 mW of light will be fixed to form a stable lens that is effectively a permanent lens within 10 to 30 minutes if the light intensity is maintained at about 10 mW. A polystyrene lens that is shaped by using greater intensities of light will require less time to form a permanent lens. A molded polystyrene lens can not be removed from a fiber tip by ultrasonic cleaning.

The use of a chemical such as silicon tetrachloride to attach a lens to a source of emitted light results in a very stably attached lens. Additionally, the use of silicon tetrachloride to attach a lens to a source of emitted light can allow a larger number of materials to be used as the lens. For example materials that are liquified upon exposure to high intensity light can be used as lenses because the thin film of silicon dioxide that is deposited on the lens forms a casing for the lens such that it retains its shape when liquified.

Figure 1:
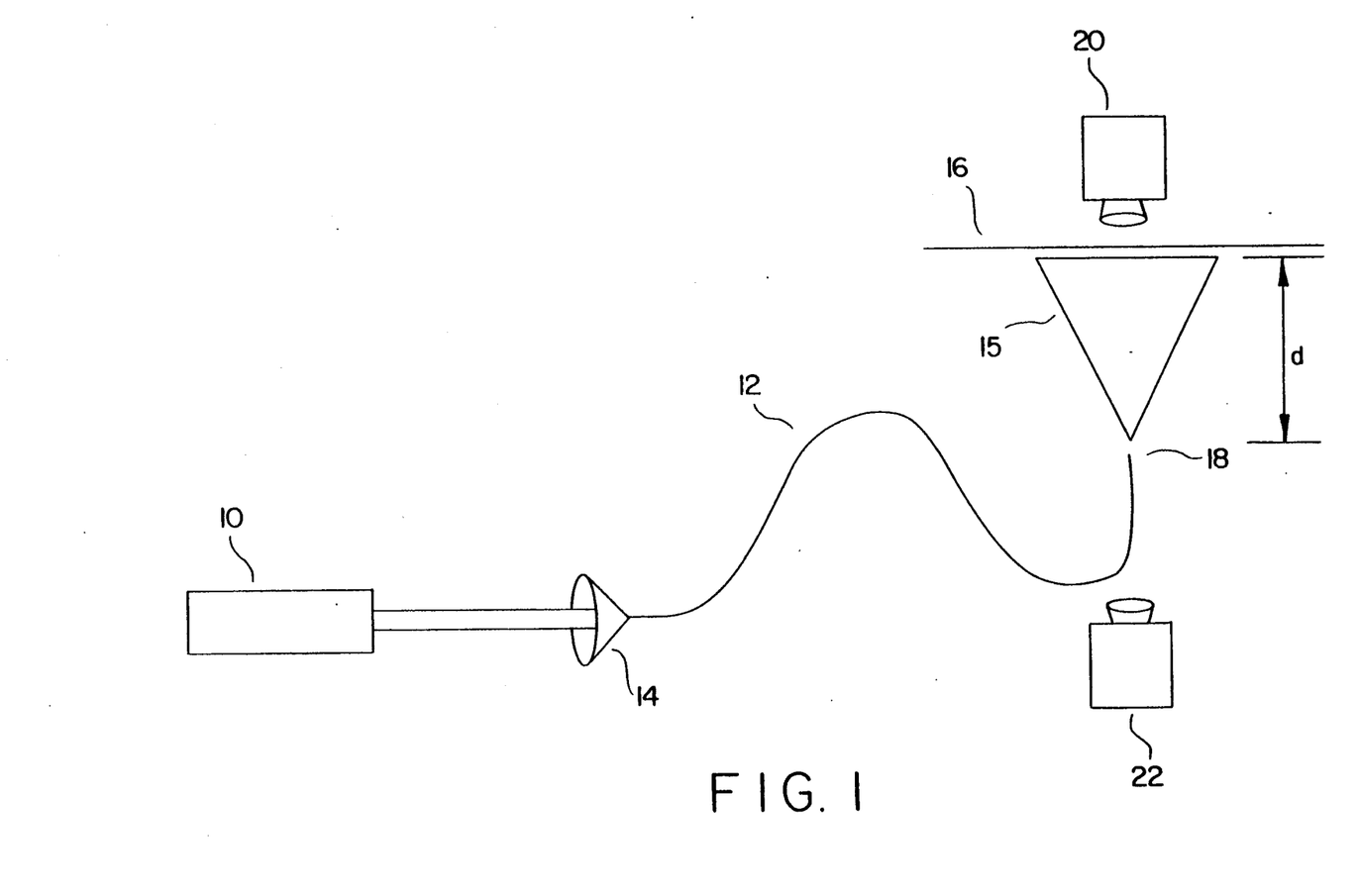
FIG. 1 is a schematic diagram of the experimental apparatus for determining the alignment of the lens upon the fiber and the numerical aperture ("NA") of the centered lens.

Determination of the Numerical Aperture of Lenses after Centering by Light Pressure The data described in the following examples was taken using an Argon ion laser at 514 nm and a single mode optical fiber with a core diameter of approximately 3 microns. With reference now to FIG. 1, our experimental apparatus consisted of a laser 10 coupled into a single mode optical fiber 12 through a microscope objective 14. The output of the optical fiber, indicated at 15, was observed on a screen 16 set at a distance d from the tip 18 of the fiber. The intensity on the screen was photographed by a polaroid camera 20 and a cross section of this intensity was obtained by digitizing a video image of the screen taken by a video camera 22.

In order to approximate the intensity cross section of the light leaving the fiber a cylindrical coordinate system was used with the center of the fiber core along the z axis and the surface of the fiber tip in the z=0 plane. The intensity was approximately given by the equation $I = I_0 \exp[-2(r/w(z))^2]$. When r is the distance from the z axis, w is the waist size of the beam and z is the distance along the axis of propagation from the point at which the light is most tightly focussed. The intensity profile was digitized and fit to a gaussian curve to obtain w(z). The numerical aperture ("NA") of the lens for a given intensity profile was calculated with the equation $NA = ArcTan(w(z)/d)$, when $z \approx d$. In each example described below d is 12 cm.

As will be apparent to those skilled in the art, a lens that has been affixed using silicon tetrachloride will have a NA that is approximately the same as the lens in each of the examples described below.

Figure 2A:
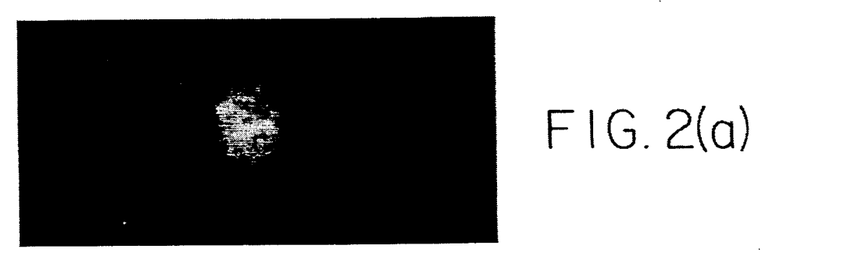
FIGS. 2a, 2b, and 2c are photographs of the intensity projected on a screen 12 cm from the fiber tip.
Figure 3:
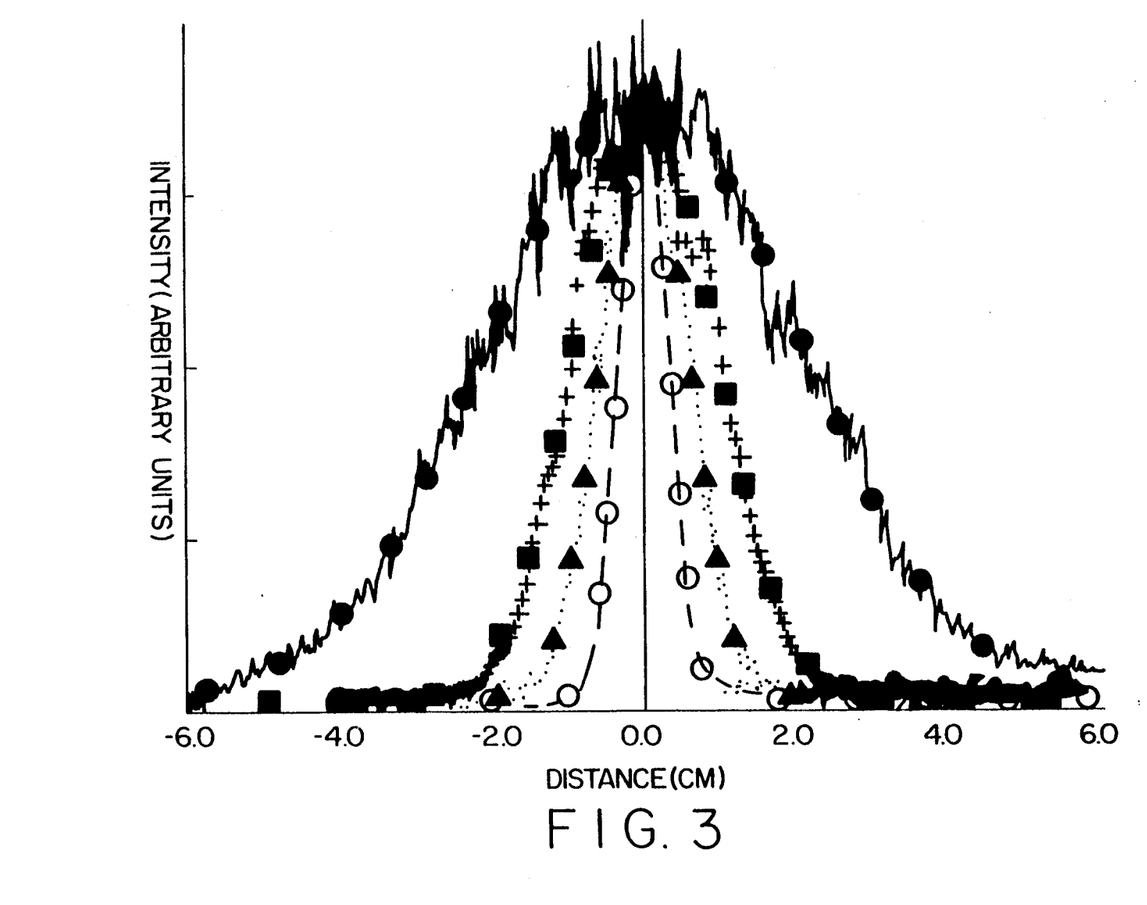
FIG. 3 is a graph showing the intensity profiles of the light emerging from the optical fiber and the Gaussian fits to these profiles. The dotted line shows the intensity profile for a naked fiber, and the solid triangles show the result of a gaussian fit giving a NA of 0.09 (corresponding to FIG. 2a). The crosses show the intensity profile for a fiber having a lens created from liquified polystyrene, and the solid squares show a gaussian fit giving a NA of 0.15 (corresponding to FIG. 2b). The solid line shows the intensity profile for a fiber having a 6 micron spherical polystyrene lens, and the solid circles show the gaussian fit giving a NA of 0.33 (corresponding to 2c). The dashed line shows the intensity profile for a fiber having a 60 micron spherical glass lens, and the open circles show the gaussian fit giving a NA of 0.05 (no corresponding photograph).

With reference now to FIG. 2a and FIG. 3 the intensity profile and numerical aperture of a freshly-cleaved naked fiber is described. FIG. 2a shows a photograph of the intensity emitted by a naked fiber. The dotted line in FIG. 3 shows a cross sectional intensity profile corresponding to FIG. 2a, and the results of a non-linear least squares fit to Gaussian intensity profiles are shown by the solid triangles in FIG. 3. The NA of the naked fiber having the intensity profile shown is 0.091. The average NA for different fiber cleaves was 0.087 with a standard deviation of ±0.003, and the measurement of NA for each cleaved fiber was independent of d. The average NA corresponds to a 1.9 micron waist at the fiber tip, which is approximately the radius of the fiber core.

The intensity profile of a fiber with a glass or a polystyrene lens was determined in the same manner after centering a lens using light pressure. With reference now to FIG. 2c and FIG. 3, the intensity and NA for a fiber with a 6 micron polystyrene ball lens was determined. A 6 micron spherical polystyrene lens was attached to a fiber as described above. Briefly, acetone diluted optical cement was used to adhere the lens to the fiber core, the lens was centered with 0.1 mW of light, and the optical cement was cured by exposure to UV light. As is shown in FIG. 2c, the output intensity is cylindrically symmetric, indicating that the lens is well centered and is of good optical quality. The solid line in FIG. 3 shows the intensity cross section for FIG. 2c. Here, the gaussian fit as indicted by the solid circles gives a NA of 0.33, corresponding to a beam waist of approximately 0.48 microns.

Similar results to those above were obtained for a fiber having a 6 micron spherical polystyrene lens using a HeNe laser source coupled into the 3 micron core fiber. Thus, in addition to Argon and HeNe lasers, it should also be possible to use laser diodes, wave guides, and semi-conductor laser sources for centering a lens.

The intensity profile and NA of a fiber having a spherical glass lens was determined, using glass spheres having diameters up to 100 microns. A small glass lens, up to 20 microns in diameter, can be centered upon a fiber using at least 0.1 mW of laser light, and the lens can be affixed to the fiber by curing the adhesive with either UV light or with high intensity laser light of about 100 mW. Larger spherical glass lenses require a higher intensity of laser light in order to center the lens, for example approximately 200 mW of laser light was required to center a 60 micron glass sphere lens. With reference now to FIG. 3, the dashed line shows the intensity profile for a fiber with a 60 micron glass sphere lens. A gaussian fit to the intensity profile shown by hollow circles indicates a NA of 0.051. This lens serves as a collimator.

Figure 2B:
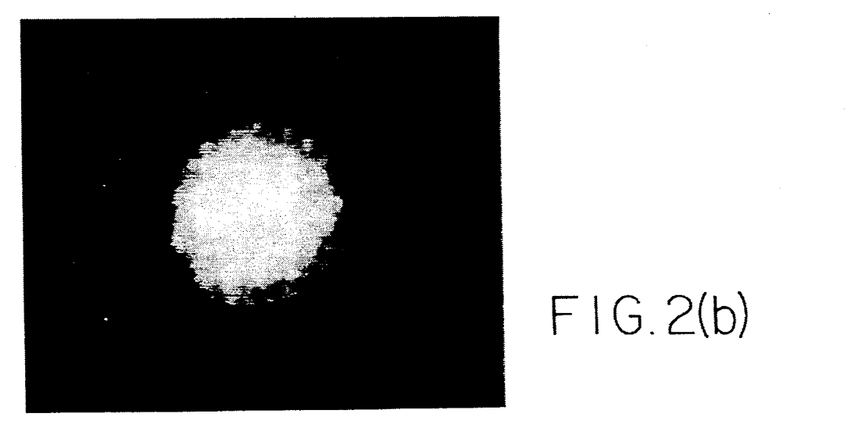
Figure 2C:
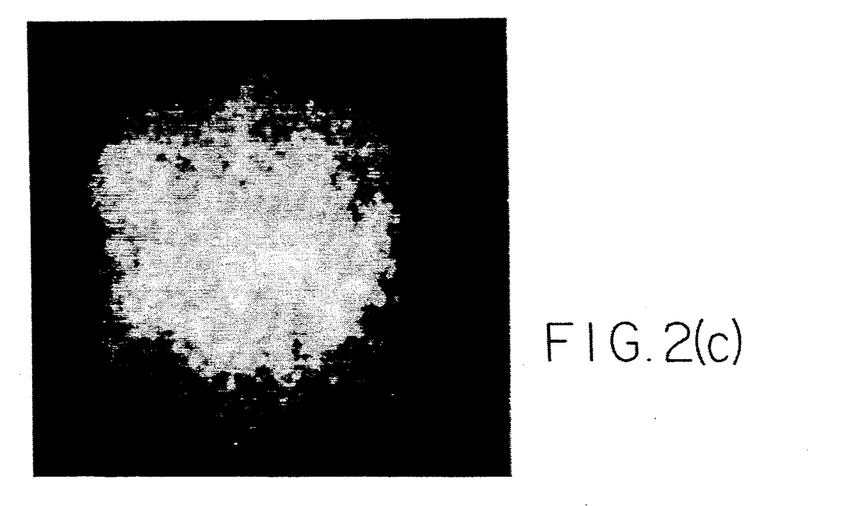

The intensity profile and NA of a molded polystyrene lens are shown in FIG. 2b, and in FIG. 3. The intensity emitted by a fiber having a molded polystyrene lens is cylindrically symmetric, indicating that the lens is well centered and is of good optical quality. The measured value of this intensity profile is shown by crosses in FIG. 3, and the gaussian fit to this cross section is shown by the solid squares and gives an NA of 0.15 corresponding to a beam waist of approximately 1.1 microns.

Figure 4A:
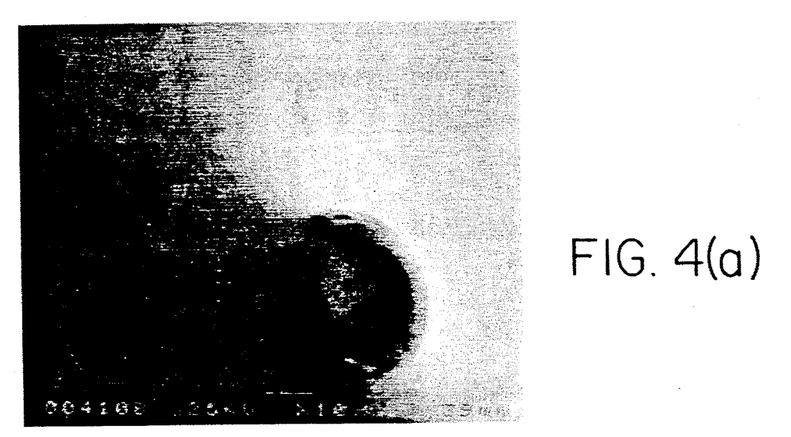
FIGS. 4a, 4b, and 4c are scanning electron micrographs of a polystyrene lens formed upon a fiber by light pressure.

SEM scans of the fiber tip verify the formation of a polystyrene lens on the fiber core. A SEM scan of a molded polystyrene lens is shown in FIG. 4a. The typical outside radius of the melted polystyrene is about 30 microns, and the size of the central depression was on the order of 10 microns. In the very center of the depression, directly above the fiber core a small convex hemispherical lens has been formed. The diameter of this lens is approximately 2 microns and the height of the lens is on the order of one micron.

Figure 4B:
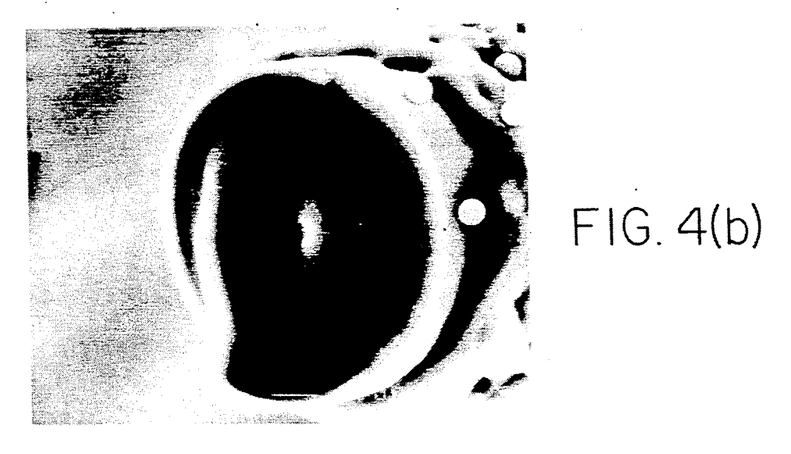
Figure 4C:
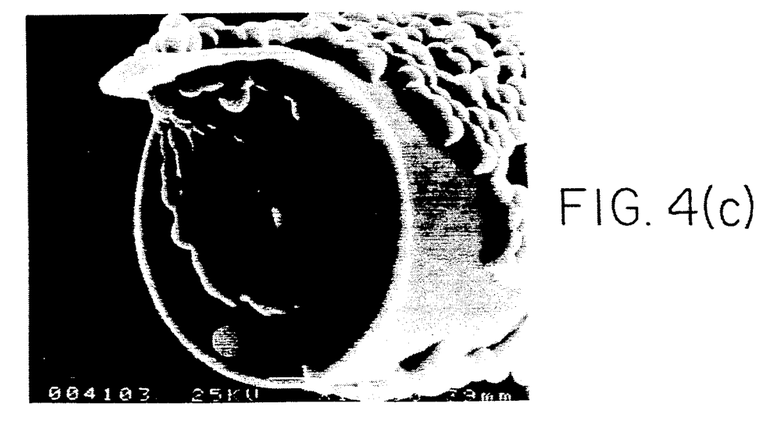

Analysis of the intensity profile of several molded polystyrene lenses provided an average NA ranging from 0.12 and 0.18, and demonstrated that these lenses do not significantly absorb the transmitted power. A SEM scan of a lens formed from liquified polystyrene is shown in FIG. 4b, and a closer view of the lens is shown in FIG. 4c.

A lens can also be made from acetate and optical cement, but the optical quality of these lenses were not as good as those obtained from polystyrene.

The change in the index of refraction of the dielectric material due to thermal gradients may play a role in the formation of a molded lenses. Additionally, the focusing properties of the lenses described for optical fibers can be enhanced by using a material with a higher index of refraction or different surface tension.

Other Embodiments

Other embodiments are within the following claims.

As will be appreciated by a person of ordinary skill in the art a lens can be brought into the proximity of a source of emitted light either by moving the source close to the lens, or by moving the lens close to the source.

As will be appreciated by a person of ordinary skill in the art the method according to the invention can be used to fix lenses to sources of emitted light other than an optical fiber, such as a laser diode and a wave guide. The steps used to align and affix a lens would be the same as described for an optical fiber.

A lens made from a dielectric fluid can be made to be either convex or concave in the following manner. A thin coating of dielectric liquid can be placed on the tip of an optical fiber and the light leaving the fiber can mold the dielectric liquid into a lens. A convex lens can be made by surrounding the dielectric liquid by a medium with a lower index of refraction, and a concave lens may be formed by surrounding the dielectric liquid by a medium with a higher index of refraction.

Greater focusing may be obtained by using a lens with a smaller radius or a larger index of refraction. It may also be possible to extend the technique to aspherical lenses. For example, the light that is emitted aspherically from a source can be used to form an aspherical lens on the source. A pancake or disc lens, having a radius that is greater than its depth, can be attached to a source using the steps described in the body of the application by allowing the electric field of the light to orient the radius of the lens perpendicularly to the emitted light and allowing the light pressure force to center the lens.

The separation between the fiber tip and the lens may be controlled by coating the source of emitted light with a transparent material, which could form a spacer between the end of the source and the lens. The use of a spacer between the source and the lens would move the lens away from the planar wavefront of light as it is emitted from the source and into the spherical range of the emitted light. For example, a spacer can be formed from a thin polystyrene film as is well known in the art.

We claim:

1. Method for aligning the optical center of a lens with a source of emitted light having an intensity maximum comprising:

positioning a lens in proximity to a source of emitted light, the emitted light having an intensity maximum;

allowing light pressure from said source to center said lens; and affixing said centered lens to said source.

2. The method of claim 1 wherein said source of emitted light is a single core optical fiber.

3. The method of claim 1 wherein said source of emitted light is a laser diode.

4. The method of claim 1 wherein said source of emitted light is a wave guide.

5. The method of claim 1 wherein said lens is formed of polystyrene.

6. The method of claim 1 wherein said lens is formed of glass.

7. The method of claim 1 wherein said lens is affixed to said source of emitted light with an adhesive.

8. The method of claim 7 wherein said adhesive is curable by exposure to UV radiation.

9. The method of claim 7 wherein said adhesive is curable by exposure to high intensity light having an intensity maximum.

10. Method for aligning the optical center of a lens with a source of emitted light having an intensity maximum, comprising:
   positioning a lens in proximity to the source of emitted light, said source of emitted light being a dual core optical fiber;
   allowing light pressure from said source to center said lens; and
   affixing said centered lens to said source.

11. Method for aligning an optical center of a lens with a source of emitted light having an intensity maximum comprising:
   positioning a lens in proximity to the source of emitted light;
   allowing light pressure from said source to center said lens, said light pressure having a power at least 0.1 mW; and
   affixing said centered lens to said source.

12. Method for aligning the optical center of a lens with a source of emitted light having an intensity maximum comprising:
   positioning a lens in proximity to the source of emitted light;
   allowing light pressure from said source to center said lens; and
   affixing said centered lens to said source of emitted light with silicon tetrachloride.

13. A method for aligning and attaching a lens to an optical fiber emitting light having an intensity maximum comprising:
   placing an optical fiber in proximity with a lens;
   aligning the axis of said fiber vertically;
   allowing light pressure from said fiber to center said lens; and
   exposing said fiber and said lens to silicon tetrachloride.

14. A method for aligning and attaching a lens to an optical fiber emitted light having an intensity maximum comprising:
   coating a tip of an optical fiber with an adhesive element;
   placing said coated tip in proximity with a lens;
   aligning the axis of said fiber vertically;
   allowing light pressure from said fiber to center said lens; and
   curing said adhesive.

15. Method for creating an aligned lens on a source of emitted light having an intensity maximum comprising:
   applying a dielectric liquid to a source of emitted light;
   allowing light pressure from said source to deform said liquid; and
   fixing said liquid to form an aligned lens.

16. The method of claim 15 wherein said dielectric liquid is polystyrene, including polystyrene balls and liquid polystyrene.

17. The method of claim 15 wherein said source of emitted light is a single core optical fiber.

18. The method of claim 15 wherein said source of emitted light is a dual core optical fiber.

19. The method of claim 15 wherein said source of emitted light is a laser diode.

20. The method of claim 15 wherein said source of emitted light is a wave guide.

21. The method of claim 15 wherein said pressure from said source has a power of between 50 and 200 mW.

22. The method of claim 15 wherein said fixing of said dielectric liquid is accomplished by increasing the intensity of the emitted light to 80 mW or greater.

23. Method for creating an aligned lens on an optical fiber emitting light having an intensity maximum comprising:
   coating a tip of an optical fiber with a dielectric liquid;
   aligning the axis of said fiber vertically;
   allowing pressure from said light to deform said liquid; and
   fixing said dielectric liquid to form a lens.

* * * * *

UNITED STATES PATENT AND TRADEMARK OFFICE
CERTIFICATE OF CORRECTION

PATENT NO. : 5,317,452

DATED : May 31, 1994

INVENTOR(S) : Mara Prentiss, Juliet A. Mervis, Adam H. Bloom and Farhad Zarinetchi It is certified that error appears in the above-indentified patent and that said Letters Patent is hereby corrected as shown below:

Column 3, lines 59, 62 and 66: please delete "gaussian" and insert therefor -- Gaussian --;

Column 4, line 1: please delete "gaussian" and insert therefor -- Gaussian --;

Column 6, line 54: please delete "gaussian" and insert therefor -- Gaussian --;

Column 7, lines 23, 45, and 54: please delete "gaussian" and insert therefor -- Gaussian --; and Column 7, line 23: please delete "indicted" and insert therefor -- indicated --.

Signed and Sealed this

Fifteenth Day of November, 1994

Attest:

BRUCE LEHMAN

*Attesting Officer*  *Commissioner of Patents and Trademarks*